United States Patent [19]
Douine et al.

[11] Patent Number: 5,467,646
[45] Date of Patent: Nov. 21, 1995

[54] PROCESS AND DEVICE FOR CONTROLLING THE BRAKING OF FOUR-WHEEL DRIVE VEHICLES

[75] Inventors: Denis Douine, Lagny Sur Marne; Gilles Durand, Voinsles, both of France

[73] Assignee: Muller BEM, Chartres, France

[21] Appl. No.: 237,993

[22] Filed: May 4, 1994

[30] Foreign Application Priority Data

May 7, 1993 [FR] France .................. 93 05492

[51] Int. Cl.$^6$ .................. G01L 5/28
[52] U.S. Cl. .................. 73/126; 73/117; 73/123
[58] Field of Search .................. 73/117, 121, 122, 73/123, 124, 125, 126, 127, 128, 129, 130, 131, 132

[56] References Cited

U.S. PATENT DOCUMENTS

| | | | |
|---|---|---|---|
| 3,365,940 | 1/1968 | MacMillan | 73/126 |
| 3,554,023 | 1/1971 | Geul | 73/126 |
| 4,050,299 | 9/1977 | Maxwell | 73/126 |
| 4,750,354 | 6/1988 | Knestel | 73/126 |
| 4,825,690 | 5/1989 | Mears | 73/117 |
| 4,893,242 | 1/1990 | Rogers et al. | 73/132 |
| 4,932,252 | 6/1990 | Bovenlander et al. | 73/123 |
| 5,101,660 | 4/1992 | La Belle | 73/117 |
| 5,335,537 | 8/1994 | Shibayama et al. | 73/117 |

FOREIGN PATENT DOCUMENTS

| | | | |
|---|---|---|---|
| 0236715 | 9/1987 | European Pat. Off. | |
| 0594428 | 2/1978 | U.S.S.R. | 73/121 |
| 0609660 | 6/1978 | U.S.S.R. | 73/126 |

*Primary Examiner*—Richard Chilcot
*Assistant Examiner*—Elizabeth L. Dougherty
*Attorney, Agent, or Firm*—Young & Thompson

[57] ABSTRACT

Process and device for controlling the braking of a brake bench of a wheeled vehicle having plural interconnected drive shafts, each shaft having a differential. One wheel on a shaft is driven in the forward direction and the other wheel on the same shaft is driven in the rearward direction. The speed ($V_A$) of the drive motor (7a) of the one wheel (3a) and the speed ($V_B$) of the drive motor (7b) of the other wheel (3b) differ from each other such that the difference of the two speeds ($V_A$, $V_B$) is maintained less than a value such as will move another shaft of the vehicle which is external to the brake bench. The difference in the two speeds ($V_A$, $V_B$) is maintained less than 5% of the speed ($V_A$) of the drive motor (7a) in the forward direction (A).

11 Claims, 5 Drawing Sheets

PROCESS AND DEVICE FOR CONTROLLING THE BRAKING OF FOUR-WHEEL DRIVE VEHICLES

FIELD OF THE INVENTION

The invention relates to a braking process for four-wheel drive vehicles, particularly for vehicles comprising several interconnected drive shafts, each shaft being provided with a differential.

The invention also relates to a device for the control of braking of vehicles with wheels of the type comprising a brake bench for a shaft, said brake bench comprising for each wheel of a shaft: a pair of drive rollers, means for indicating the peripheral speed of the wheel and means for detecting the drive force of the wheel by the pair of rollers.

BACKGROUND OF THE INVENTION

There is generally used for two-wheel drive vehicles brake benches of a type known per se, comprising two pairs of rollers adapted to be driven in the same direction by electric motors. The two wheels on the same shaft of the vehicle are advanced to position each between the two rollers of the corresponding pair; then the wheels are driven in rotation in a forward direction at low speed of the order of 5 km/hour by means of rollers driven by electric motors. The indicator means for the peripheral speed of the wheels are provided in the form of cylinders in tangential contact, driven in rotation by the wheels and provided with tachymetric detectors supplying a signal representative of the peripheral speed of the corresponding wheel. The casings of the electric motors are generally fixed to the brake bench by means of a force detector supplying a signal representative of the forces exerted on the securements of the motor casings when there is exerted a braking force on the wheels of the shaft to be controlled.

As a safety measure, the cylinders that indicate the peripheral speed of the controlled wheels are mounted on a system comprising a lever, which is actuated when a wheel is located between the corresponding drive rollers. Descending movement of this lever causes the closure of an electric contact authorizing starting of the electric drive motor of the rollers.

In known manner, the control of the braking of a two-wheel drive vehicle takes place in the following manner:

a) In a first phase in which the two wheels are simultaneously driven in the same direction at the same speed, no braking force is exerted on the brake pedal of the vehicle by the operator. The mentioned force detectors supply signals representative of the residual braking values on one or the other wheel. These residual values are generally very small and are notable in the case of poor release of the brakes or of a resistance to rotation resulting for example from a poor condition of the bearings.

b) In a second phase in which the wheels on the same shaft are driven in the forward direction, a constant pressure is applied to the brake pedal by the operator. The mentioned force detectors supply values representative of the variations of braking on one and the other wheel. The variations of braking are representative of the ovalization of the wheels or of defects in the brake members: for example, a deformation of the brake drum in the case of drum brakes, or a distortion of the disc in the case of disc brakes.

c) In a third phase in which the two wheels are driven simultaneously in a forward direction, a pressure is applied progressively up to a maximum value on the brake pedal by the operator. The test is halted when the relative slippage of the wheel on the drive rollers is equal to a predetermined value. The maximum braking force achieved in the course of this test is noted for each wheel of the controlled shaft.

The maximum braking forces are compared with parameters supplied by the manufacturer or parameters calculated from previous tests, so as to determine whether the braking is satisfactory or insufficient.

For two-wheel drive vehicles, the brake benches in which the two wheels of a controlled shaft are simultaneously driven in a forward direction provide a control process for braking and corresponding results that are entirely satisfactory.

It is not possible to use the known process and braking mode to control the braking of a four-wheel drive vehicle, in which an intermediate device for transmission of movement such as a visco coupler or an epicycloidal differential transmits a portion of the energy of the driven shaft to another shaft.

It is also known that it is impossible to use a single brake bench to cause to turn the two wheels of a same shaft in the same direction, the other shaft being in contact with the ground: thus, in the case in which the two wheels on a same shaft are driven in the same direction, it is known that the vehicle is thrown from the brake bench, even at low speed. To overcome these drawbacks, there has been envisaged:

1. mounting the first shaft of a vehicle on a control bench and mounting the second shaft on freely rotatable wheels. Such an arrangement requires, in order to be able to control the two shafts, mounting the free rollers on opposite sides of the braking control bench. However, because of unequal distribution of forces between the four rollers, there is a compensation of the forces and an artificial reduction of the dissymmetries of braking the right and left wheels of the controlled shaft.

Thus, this system does not permit giving exact values of the braking characteristics of each wheel.

2. mounting said shafts simultaneously on two control benches. However, this solution requires adjusting the spacing of the two benches as a function of the wheel base of the vehicle and regulating the speed of the four wheels constantly to be at the same value by means of a costly regulation device having limited ranges of stability.

A third solution is proposed by EP 0 236 715, which describes a process and a device for controlling automotive vehicle brakes provided with several driven shafts permanently interconnected, said vehicles having a differential for each shaft.

The wheels of at least one shaft are driven in the opposite direction by first rollers of a brake test bench, and are braked individually upon control, and the braking action of this brake on the drive of the set of rollers of this wheel is read off. In the corresponding processes and devices, the speed of rotation of the driven wheels is measured directly in the course of the braking procedure and is maintained at a same value by control of the drive of the set of rollers driving these wheels.

The fact that the speed of rotation of the wheels is directly measured during control of the brakes and is maintained at an equal value for the two wheels, has the result that there will be no rotative movement of the transmission shaft having a cardan joint kinematically connected to the shaft of these two wheels by means of the differential, and that there accordingly will not be any transmission of a couple to the other shafts rigidly coupled to this transmission shaft.

The measured speeds of rotation of the wheels of a shaft are continuously compared, either at predetermined values, or with each other, and, by regulation of the drive power of the two sets of rollers in question, are maintained at the same value. In practice, the corresponding regulation to equality of the speeds of rotation of the two driven wheels in a direction opposite to each other is delicate to effectuate: it is therefore indispensable to fix reflectors serving as indicia on the wheels, these reflectors each returning a luminous beam from a source toward a detector to supply a signal representative of the angle of rotation and of the angular velocity of rotation of each wheel.

This device can give satisfaction, but its production is costly and its use delicate. This device is only intermittently operable because soiling of the wheels during rotation dirties the optical reflectors.

Moreover, in four-wheel drive vehicles, the visco coupler or the epicycloidal differential has a starting couple which is not zero. This couple can give rise to braking counterforce, from one side to the other, equal to this couple. The document EP 0 236 715 does not provide measurement means taking account of these possible braking counterforces.

SUMMARY OF THE INVENTION

The invention has for its object to overcome the above drawbacks, by providing a new braking device, adapted to be used in the conventional manner for controlling the braking of two-wheel drive vehicles, and adapted to be used by means of the process according to the invention, for the braking control of four-wheel drive vehicles, in which the motor shafts cannot be decoupled.

The invention has for its object a process for controlling the braking of wheeled vehicles, particularly for vehicles comprising several interconnected driven shafts, each shaft being provided with a differential, in which one wheel to be controlled on a shaft is driven in the direction of forward movement, and the other wheel on the same shaft in the reverse direction, characterized in that the speed of the drive means of the wheel to be controlled and the speed of the drive means of the other wheel are different and in that the difference of the two speeds is maintained less than a predetermined value so as not to give rise to movement of another shaft of the vehicle outside the brake bench.

According to other characteristics of the invention:
— the difference of the two speeds is maintained less than 5% of the speed of the drive means in the forward direction,
— the drive means are asynchronous electric motors and the frequency of the drive motor in forward movement is adjusted as a function of the difference of the peripheral speeds of the two wheels.

According to a modified embodiment, the process according to the invention comprises the following steps:
a) maintaining the forward drive means at a constant speed and the reverse drive means at a speed that continuously varies between a minimum speed less than said constant speed and a maximum speed greater than said constant speed, to measure in the absence of any braking the drive forces on the forwardly-driven wheel to be controlled and on the other reversely-driven wheel,
b) drawing the correction curve corresponding to the difference of said drive forces as a function of the difference of the speeds of the drive means,
c) measuring the respective peripheral speeds of the wheel to be controlled and the other wheel in the absence of any braking and maintaining constant the difference of the speeds of the drive means while correcting the measured forces by use of the correction curve of step b),
d) calculating and recording the difference of said corrected peripheral speeds in the absence of any braking,
e) continuously measuring during the braking the difference of the peripheral speeds to control the speed of the forward drive means by following a regulatory law adapted to maintain the difference of the peripheral speeds of the wheels less than a predetermined value,
f) measuring the braking variations indicating an ovalization of the wheels, or measuring the braking force corresponding to a maximum value for slippage of the wheels on the rollers,
g) continuously correcting the values obtained in step f) by use of the correction curve obtained in step b), which supplies the instantaneous correction values as a function of the different Δ of the instantaneous peripheral speeds of the wheels.

The invention also has for its object a braking control device for wheeled vehicles, of the type comprising a brake bench for a shaft; said brake bench comprising for each wheel of the shaft a pair of drive rollers, means for indicating the peripheral speed of the wheel and means for detecting the drive force of the wheel by the pair of rollers; each pair of rollers being driven by a drive motor, characterized in that the device comprises a first supply or control means to drive a first drive motor at a substantially fixed speed and a second supply or control means to drive a second drive motor at a speed variable as a function of a predetermined control law.

According to other characteristics of the invention:
— the drive motors are electric motors supplied either by constant frequency electric current (first means), or by variable frequency electrical supply (second means),
— the predetermined control law comprises a first phase of a continuous variation of the speed of the second drive motor,
— the predetermined control law comprises a second phase of variation of the speed of the second drive motor, in which this speed variation is effected as a function of the difference of the peripheral speed of a first wheel and the peripheral speed of a second wheel.

BRIEF DESCRIPTION OF THE DRAWINGS

The invention will be better understood from the description which follows given by way of non-limiting example, with reference to the accompanying drawings, in which.

DETAILED DESCRIPTION OF THE INVENTION

Figure 1:
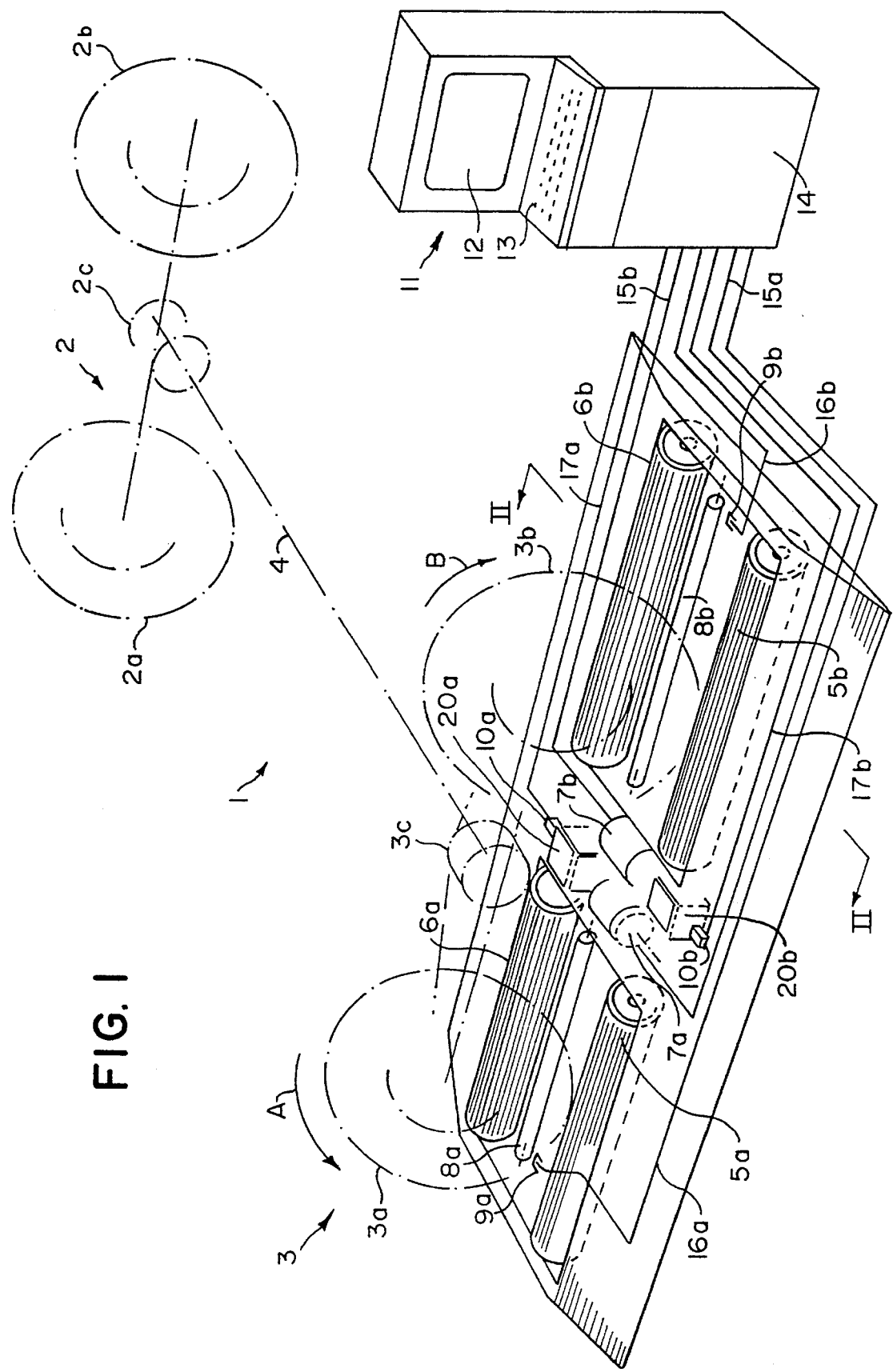
FIG. 1 shows a general schematic view of a device according to the invention.

Referring to FIG. 1, a four-wheel vehicle schematically shown in broken line comprises a first shaft 2, and a second shaft 3. The shaft 2 is provided with two wheels 2a, 2b and with a differential 2c, while the shaft 3 is provided with two wheels 3a, 3b and a differential 3c: these differentials permit driving the wheel 2a in the opposite direction from wheel 2b, or the wheel 3a in the opposite direction from wheel 3b.

The differentials 2c, 3c are connected by a mechanical connection 4, which can be a rigid shaft, but more generally a coupling means such as a visco coupler associated or not with a free wheel device or an epicycloidal differential.

The general type of vehicle corresponding to the vehicle 1 is for example a four-wheel drive vehicle of the so-called integral transmission type whose differentials 2c and 3c permit the rotation in opposite directions from each other of the adjacent wheels.

The wheels 3a and 3b are mounted on drive rollers 5a, 6a and 5b, 6b. The drive rollers 5a, 6a are driven in synchronous fashion by a motor 7a so as to turn the wheel 3a in the direction of the arrow A corresponding to forward movement, while the drive rollers 5b, 6b are driven by an electric motor 7b, so as to drive the wheel 3b in the direction of the arrow B corresponding to reverse movement.

The peripheral speed of the wheel 3a is obtained by means of a measurement cylinder 8a driven by the wheel 3a, said cylinder coacting with a tachymetric detector 9a situated immediately adjacent one of its ends. In analogous fashion, the peripheral speed of the wheel 3b is obtained from the measurement cylinder 8b and the tachymetric detector 9b. The casings of the motors 7a, 7b and the differential gearing as the case may be are mounted on the chassis of the brake bench by means of force detectors 10a, 10b to supply a signal representative of the braking forces applied by the wheel to the rollers during the braking tests.

These general arrangements are also known for driving two-wheel drive vehicles: in this case, the wheels 3a and 3b are driven in the same forward direction corresponding to the arrow A.

The device also comprises an interactive control terminal 11, provided with a display screen 12, and a data input keyboard 13. The command and control terminal 11 comprises in its lower portion 14 an electrical supply connected to the motors 7a, 7b by supply cables 15a, 15b, and electronic cards for processing signals received by the transmission lines: namely, for the transmission of the peripheral speeds of the wheels, 16a, 16b, for the transmission of signals representative of the braking forces 17a, 17b.

According to the invention, the device is arranged so as to drive the wheel 3a in the forward direction A at a substantially fixed speed, for example by supplying an asynchronous electric motor 7a at a fixed frequency, and so as to drive a second drive motor in the reverse direction B at a speed variable as a function of a predetermined control law. Preferably there is used for this purpose a speed variator with frequency variation which permits driving the rollers 5b, 6b at a speed variable as a function of the variable frequency supplying the motor 7b, while seeing to it however that the absolute difference of the speeds, between the forward direction A and the reverse direction B, will not be greater than a speed giving rise to throwing the vehicle from the brake bench.

Thus, when the difference in absolute speeds of the drive rollers is maintained less than 5% of the speed of the drive means constituted by the rollers 5a, 6a in the forward direction, it will be understood that the energy transmitted to the rear differential 2c is relatively low and is not susceptible of giving rise to an ejection of the vehicle from the bench.

Figure 2:
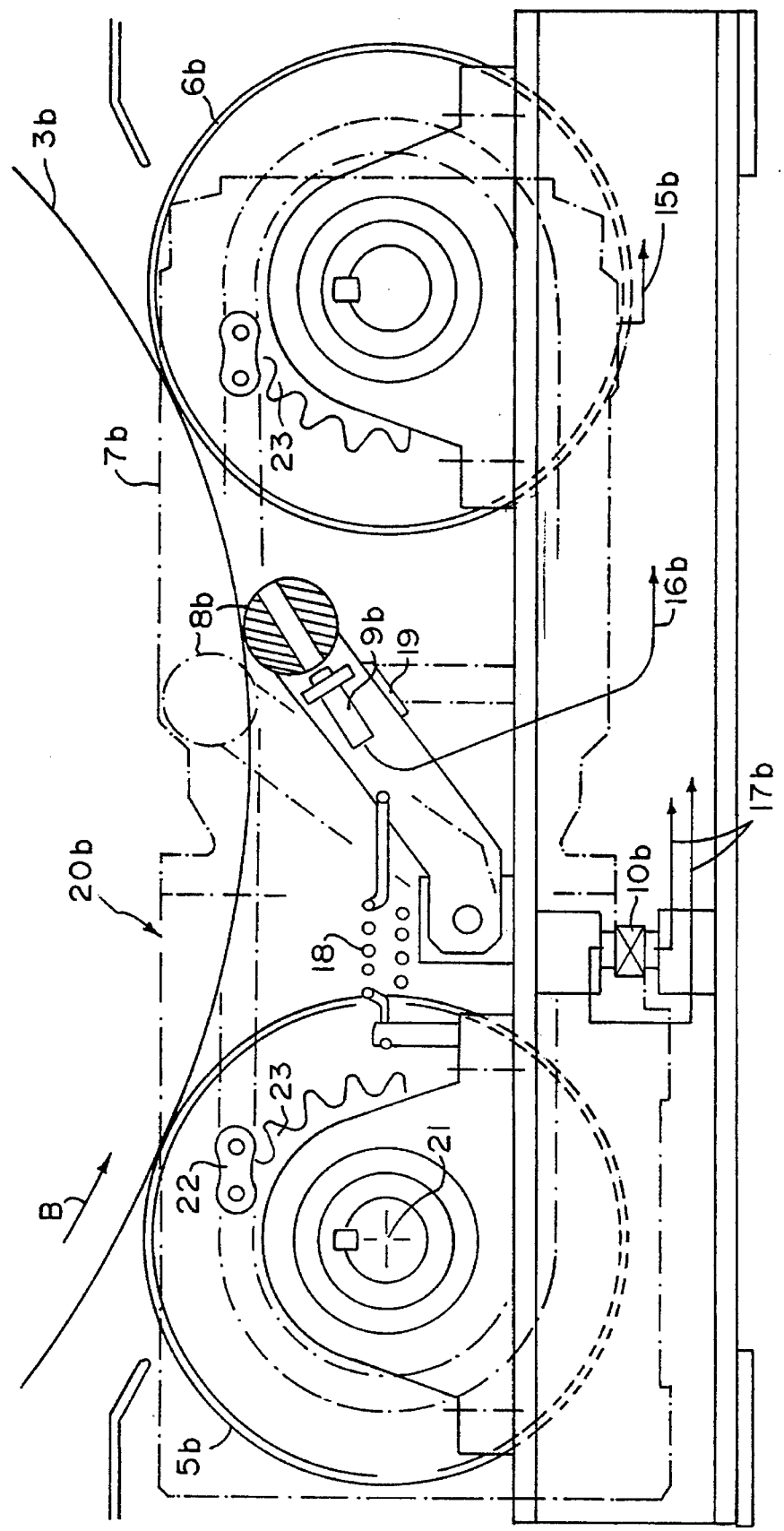
FIG. 2 is a fragmentary enlarged cross-sectional view of the device according to the invention.

Referring to FIG. 2, the wheel 3b present in the brake bench, applies the measuring cylinder 8b downwardly against a spring 18 adapted to return the cylinder 8b whose position is indicated in broken lines. In the first low position shown in full lines, a presence detector 19 supplies an authorization signal for starting the drive motor 7b supplied by the supply cable 15b and prevents any untimely starting of the motor 7b in the absence of a wheel on the brake bench. The motor 7b drives by means of angle gearing 20b a shaft 21 forming a portion of a chain transmission 22 and pinions 23, which drive the two drive rollers 5b, 6b.

The force detector 10b located here in intermediate position supplies a negative force or a positive force signal according to the direction of drive of the wheel 3b, this signal being transmitted by a wire connection 17b to a supply and control terminal 11 not shown.

In contrast to the process described in the document EP 0 236 715, which provides maintaining constantly equal the speeds of rotation of the two wheels driven in opposite directions from each other, the present invention provides measuring the wheel characteristics of braking taking account also of the starting couples of the differentials 2c, 3c and the kinematic connection 4 between the two differentials 2c, 3c: to this end, it is provided that the speed of rotation in the forward direction A of the wheel 3a will be slightly different from the speed of rotation of the wheel 3b in the reverse direction B, which gives rise to a very slight drive of the differential 3c and permits taking account of the starting couple of this differential 3c in controlling the braking.

Moreover, when it is provided to supply a brake bench of known structure so as to drive the wheels in the forward direction at the same speed, it is possible to control in the same bench two-wheel drive vehicles and four-wheel drive vehicles, which permits either using the benches of the prior art by means of a new control installation of a device according to the invention, or testing a two-wheel drive vehicle also by means of the device of the invention by a simple commutation of the supplies of the motors 7a, 7b.

Figure 3:
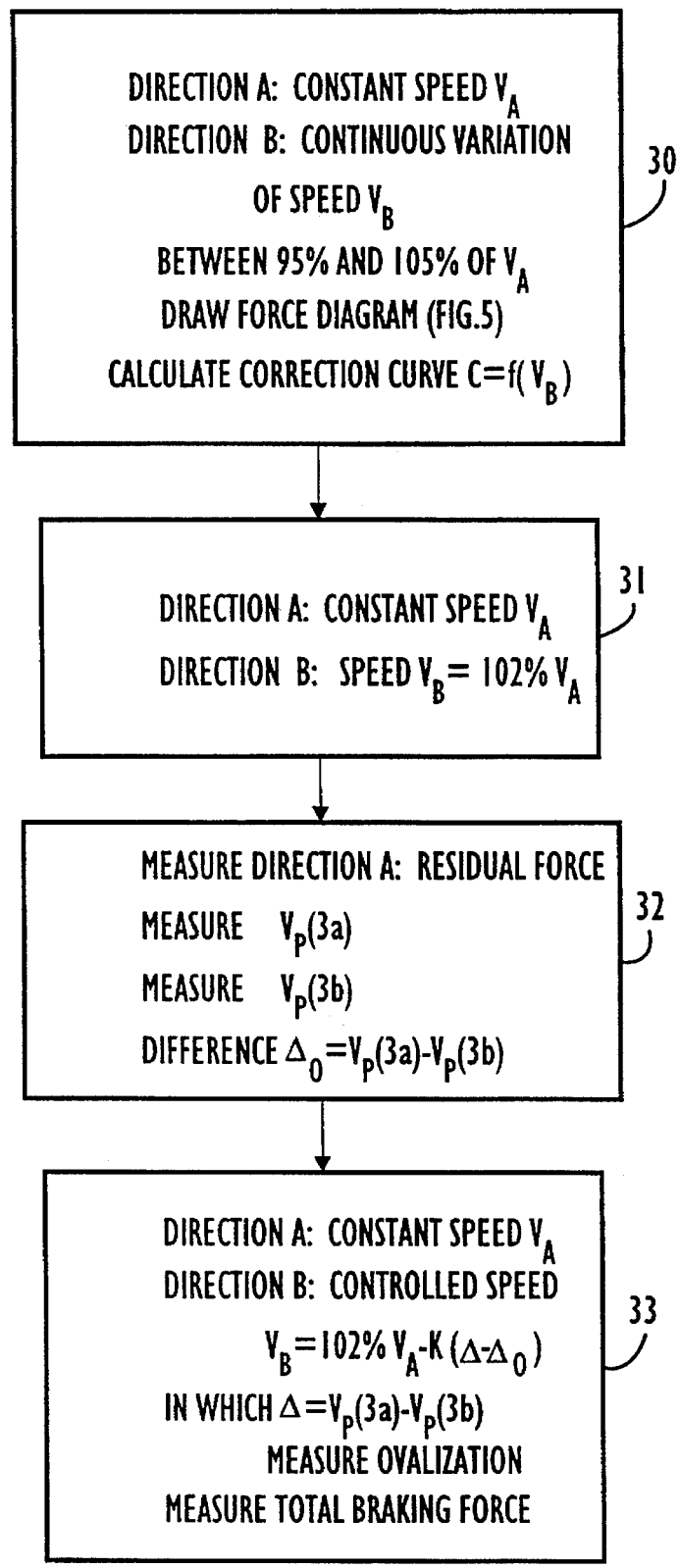
FIG. 3 is an explanatory scheme of the steps of the process according to the invention.

Referring to FIG. 3, a control process for braking of wheeled vehicles comprising several interconnected motor shafts, each shaft being provided with a differential, in which a wheel to be controlled is driven in the forward direction and the other wheel of the same shaft in the rearward direction, comprises the following steps:

In step 30, the speed of the drive motor 7a in the forward direction A is maintained substantially constant while being supplied by electrical frequency of the network, typically 50 Hz in France. In contrast, the drive speed of the motor 7b in the rearward direction B varies continuously from a minimum value less than about 5% of the drive speed in the forward direction A to a maximum value greater than about 5% of the speed of the drive means in the forward direction A. This speed variation can be obtained simply by causing to vary the supply frequency of the motor 7b for example from 48 Hz to 52 Hz. During this variation, the curves representative of the forces exerted by the wheels in contact with the drive rollers are recorded, to obtain a diagram such as that shown in FIG. 5.

The drive forces in the absence of any braking correspond to the starting forces of the differential 3c and to the resistive forces of the wheels 3a and 3b which are generally very low. From the force diagram, there can be calculated a correction curve corresponding to the algebraic addition of the forces resulting respectively from the forward movement of one wheel and the rearward movement of the other wheel.

In step 31, the wheel 3a is driven in the forward direction A at a constant speed and the wheel 3b in the rearward direction B at a speed greater by 2% than the drive speed in the forward direction A.

To do this, there is driven for example the motor 7a at 50 Hz in the forward direction A, and the motor 7b at a supply frequency of 51 Hz in the rearward direction B; when the movement is completely stabilized, the following step 32 is taken.

In step 32, the rotational drive conditions of step 31 are maintained, and the force produced by the wheel 3a in rotation in the forward direction A is measured. This measurement is effected in the absence of any braking and gives the residual forces corresponding to the drive of the wheel in the forward direction A. Preferably, several measurements are taken so as to obtain a statistical mean from several measurements.

The absolute values of the peripheral speed $V_p$ (3a) of the wheel 3a and of the peripheral speed $V_p$ (3b) of the wheel 3b are also measured by means of measurement cylinders 8a, 8b and tachymetric detectors 9a, 9b. The difference $\Delta_0$ of the mean peripheral speed between the wheels 3a and 3b is then calculated.

In step 33, the motor 7a is driven at a substantially constant speed and the speed of motor 7b is subjected to a proportional control loop (if desired integral and derived) so as to follow the speed law corresponding to the following control law: $V_B = 102\% \, V_A - K(\Delta - \Delta_0)$, in which K is a constant of proportionality experimentally determined to obtain good stability of the counter-reaction loop and a sufficiently short response time;

$\Delta$ is equal to the difference of the measured peripheral instantaneous speeds $V_p$ (3a), $V_p$ (3b) of the wheels 3a and 3b, respectively;

$\Delta_0$ is the correction constant corresponding to the difference of peripheral speeds of the wheels 3a and 3b measured in step 32.

The ovalization of the wheel 3a driven in the forward direction is then measured by braking tests of known type while continuously correcting the force values obtained from the correction curve C obtained in step 30, which supplies the instantaneous correction values as a function of the difference $\Delta$ of the instantaneous peripheral speeds of the wheels 3a and 3b.

The maximum braking force corresponding to predetermined slippage of the wheel 3a driven in forward direction is then measured and a force correction analogous to that effectuated for the measurement of ovalization is then continuously performed.

Thus, thanks to the process according to the invention, there can be obtained values truly corresponding to the braking forces on a wheel driven in a forward direction A of a four-wheel drive vehicle whose wheels are coupled to each other by a central transmission mechanism 4. Moreover, the process according to the invention permits controlling braking without using an optical detector of angular velocity or a costly regulation system, such as those described in the document EP 0 236 715.

Figure 4:
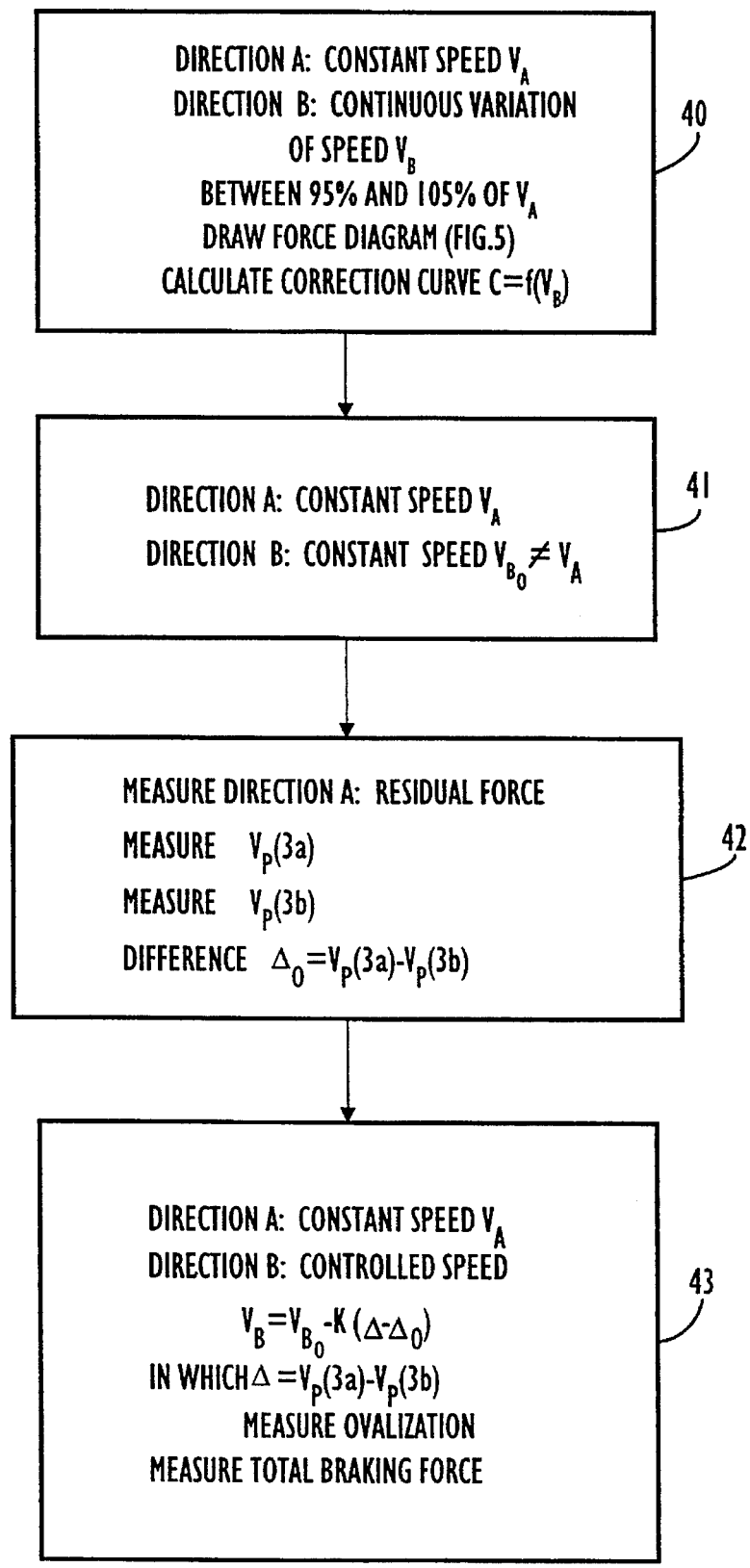
FIG. 4 is a second explanatory scheme of a modified procedure according to the invention.

Referring to FIG. 4, a modification of the process according to the invention comprises a first step 40 identical to step 30 described with reference to FIG. 3. This step thus permits calculating and effecting the recordation of a corrective curve as a function of the variation of the speed of the drive motor 7b corresponding to drive in the rearward direction B.

In the following step 41, the drive means 7a is driven at a speed $V_A$ for example by means of a supply frequency of 50 Hz while the drive means 7b is driven at a constant speed $V_{BO}$ different from the constant speed $V_A$. Preferably, the speed $V_{BO}$ is selected in correspondence with a point which corresponds to equality of the absolute values of the forward drive forces and the rearward drive forces, as described later on with reference to FIG. 5. Upon stabilization of the drive regime of the wheel 3a in the forward direction A and the wheel 3b in the rearward direction B, the following step 42 is taken.

In step 42, the drive conditions in rotation are those of step 41, and measurements analogous to those effected in step 32 of FIG. 3 are taken.

In step 43, the drive means 7a is supplied at a fixed frequency corresponding to a rotative drive speed in the forward direction $V_A$, while the drive means 7b is driven at a speed $V_B$ regulated by the counter-reactive control loop to follow the following control law: $V_B = V_{BO} - K(\Delta - \Delta_0)$, wherein $V_{BO}$ is the constant drive speed used in step 41.

K is a proportionality constant determined experimentally to obtain good stability of the counter-reactive loop and a sufficient short response time, $\Delta$ is the difference of the instantaneous peripheral speeds of the wheels 3a and 3b, $\Delta_0$ is the difference corresponding to the correction determined in step 42.

In known manner, the ovalization is then measured as well as the total braking force in an manner analogous to the steps taken for two-wheel drive vehicles while continuously making the correction described in step 33.

Figure 5:
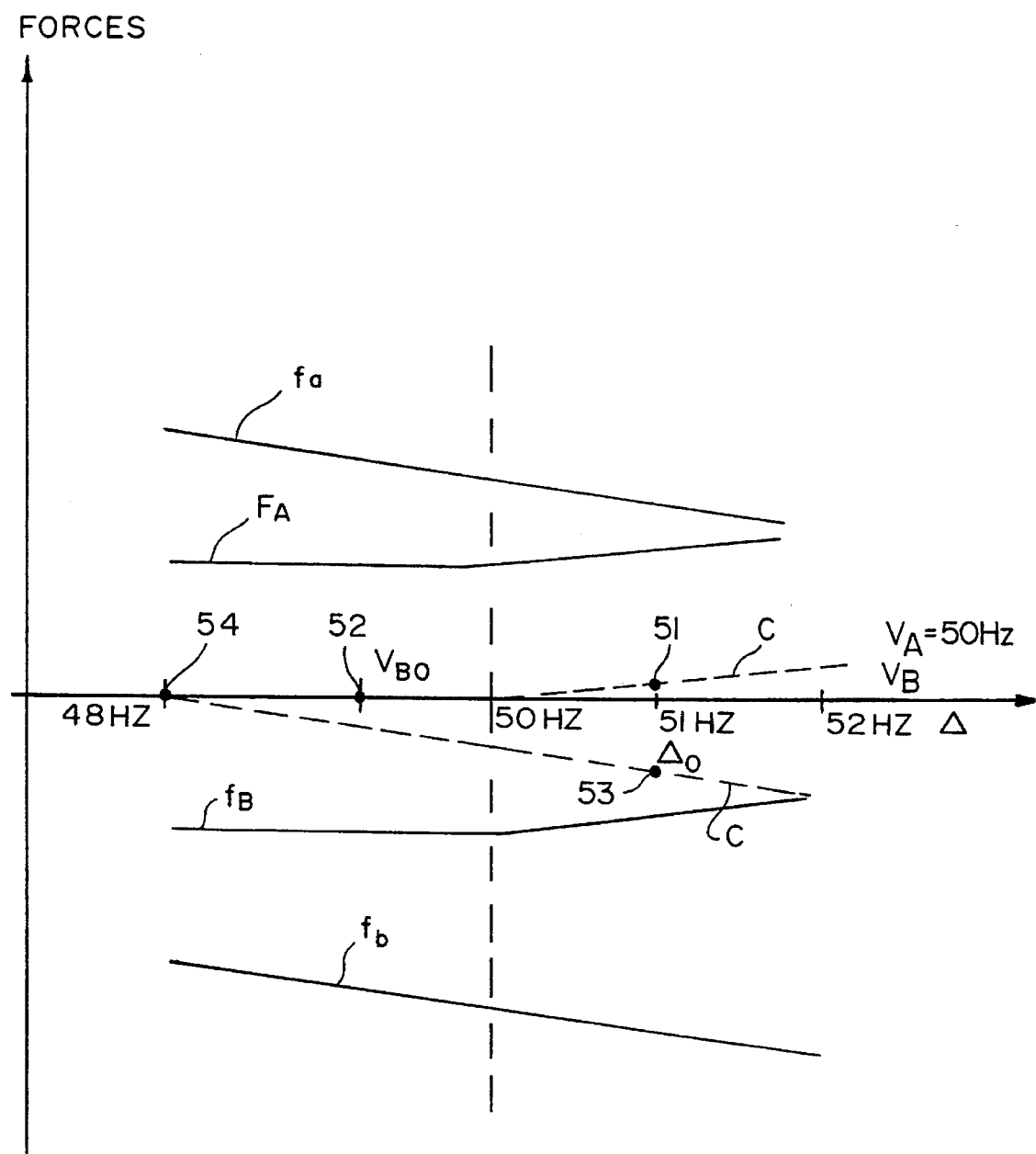
FIG. 5 shows a characteristic curve obtained by practice of the invention.

Referring to FIG. 5, the curves FA, FB, correspond to drive forces measured in contact with the respective rollers of a forward wheel 3a driven in the forward direction A, and a forward wheel 3b driven in the rearward direction B.

The algebraic sum C of the curves FA, FB as a function of the variation of the drive speed $V_B$ of the motor 7b resulting from a progressive frequency variation from 48 to 50 Hz is obtained by algebraic addition of the curves FA and FB. It will be seen that the correction curve C is zero to a value corresponding to 50 Hz and rises slightly between 50 Hz and 52 Hz. It is noted that, on the same shaft, the correction curve C does not vary regardless of the braking force applied with a constant pressure measured by means of a pedometer on the brake pedal of the vehicle.

Of course, the correction curve C in the absence of any braking corresponds also to the correction depending on the difference $\Delta$ of the instantaneous peripheral speeds of the wheels 3a and 3b.

In this example, according to the process described with reference to FIG. 3, there is chosen as error correction the value C corresponding to 51 Hz shown by the point 51 in FIG. 5.

According to the process described with reference to FIG. 4, there is chosen as the speed $V_{BO}$ a value corresponding to a zero correction C, which is to say a speed value corresponding to a frequency comprised between 48 Hz and 50 Hz, for example as shown at 52 in FIG. 5. It will thus be seen that the second process described with reference to FIG. 4 corresponds to a good distribution of the forces between the two wheels and a minimization of the force applied to the differential 3c and to the mechanical transmission line 4.

In FIG. 5, there are also shown forces corresponding to the rear shaft of the same four-wheel drive vehicle: the drive force in the forward direction is shown by the straight line fa while the drive force in the rearward direction is shown by the straight line fb.

In analogous manner, there is obtained by algebraic summation the correction curve c representing the force due to the viscosity of the transmission line 4 or of starting the differential 3c. It will be seen that according to the process shown with reference to FIG. 3, the operational point 53 corresponds to the correction to be applied at a frequency of 51 Hz.

When the process described with reference to FIG. 4 is used, the operational point 54 corresponds to the speed $V_{BO}$ corresponding to equality of the drive forces on the driven wheels in opposite directions from each other.

The invention has been applied to the measurement and control of braking of four-wheel drive vehicles existing on the French market and has given entire satisfaction.

The invention described in reference to drive means constituted by electric motors is not thus limited, but includes on the contrary any variation of drive means: hydraulic, pneumatic or other, adapted to be controlled by a counter-reaction loop to follow a predetermined control law.

What is claimed is:

1. Process of controlling the braking on a brake bench of a wheeled vehicle having plural interconnected drive shafts, each shaft having a differential, said brake bench comprising for each wheel of the axle a pair of drive rollers; said drive rollers being driven in asynchronous fashion by drive means; said process comprising:
   —driving one wheel on a shaft in the forward direction and one other wheel on the same shaft in the rearward direction, and
   —adjusting the speed ($V_A$) of the drive means (7a) of the one wheel (3a) and the speed ($V_B$) of the drive means (7b) of the other wheel (3b), said two speeds ($V_A$, $V_B$) being different from each other such that the difference of the two speeds ($V_A$, $V_B$) is maintained less than a value such as will move another shaft of the vehicle which is external to said brake bench.

2. Process according to claim 1, wherein the difference in the two speeds ($V_A$, $V_B$) is maintained less than 5% of the speed ($V_A$) of the drive means (7a) in the forward direction (A).

3. Process according to claim 1, wherein the drive means are asynchronous electrical motors (7a, 7b) and the frequency of the drive motor (7b) in the rearward direction (B) is adjusted as a function of the difference ($\Delta$) of the peripheral speeds of the two wheels (3a, 3b).

4. Process according to claim 1, comprising also the following steps:
   a) maintaining the drive means (7a) in the forward direction (A) at a constant speed ($V_A$) and the drive means (7b) in the rearward direction (B) at a speed ($V_B$) that continuously varies between a minimum speed less than said constant speed ($V_A$), to measure in the absence of any braking the drive forces on said one wheel (3a) driven in the forward direction (A) and on the other wheel (3b) driven in the rearward direction (B), and a maximum speed higher than said constant speed ($V_A$);
   b) forming a correction curve (C, c) corresponding to the difference of said drive forces ($F_a$, $F_b$; $f_A$, $f_B$) as a function of the differences of the speeds ($V_A$, $V_B$) of the drive means or of the differences of the peripheral speeds ($V_p$) of the wheels (3a, 3b).

5. Process according to claim 4, including also the following steps:
   c) measuring the respective peripheral speeds of the one wheel (3a) and the other wheel (3b) in the absence of any braking and maintaining constant the difference of the speeds ($V_A$, $V_B$) of the drive means (7a, 7b) and correcting the measured forces from the correction curve obtained in step b) so as to obtain corrected peripheral speeds;
   d) calculating and recording the difference ($\Delta_0$) of said corrected peripheral speeds in the absence of any braking.

6. Process according to claim 5, comprising also the following steps:
   e) continuously measuring during braking the difference ($\Delta$) of the peripheral speeds to control the speed ($V_B$) of the drive means (7b) in the rearward direction (B) by following a control law adapted to maintain the difference ($\Delta$) of the peripheral speeds of the wheels (3a, 3b) less than a predetermined value;
   f) measuring the braking variations indicating an ovalization of the wheels (3a), or measuring the braking force corresponding to a maximum slippage of drive wheels (3a) on the rollers (5a, 6a), and correcting the measurements obtained from the correction curve (c, C) in step b).

7. Control device for braking of wheeled vehicles, comprising a brake bench for an axle of the vehicle, said brake bench comprising for each wheel of the axle a pair of drive rollers, means indicating the peripheral speed of each wheel and means for detecting the drive force of each wheel by the corresponding pair of rollers; each pair of rollers being driven by a drive motor, first means to drive a first said drive motor (7a) at a speed ($V_A$) which is substantially fixed and second means to drive a second said drive motor (7b) at a variable speed ($V_B$) as a function of a predetermined control law, wherein said control law is determined in such a way that the difference of the two speeds ($V_A$, $V_B$) is maintained less than a value such as will move a shaft of the vehicle which is external to said brake bench.

8. Device according to claim 7, wherein the drive motors are electric motors.

9. Device according to claim 7, wherein said control law comprises a first phase (30, 40) of continuous variation of the speed ($V_B$) of the second drive motor (7b).

10. Device according to claim 9, wherein said control law comprises a second phase (33, 43) of variation of the speed ($V_B$) of the second drive motor (7b) in which this latter speed variation is effected as a function of the difference ($\Delta$) of the peripheral speed of a first wheel (3a) and of the peripheral speed of a second wheel (3b).

11. Process according to claim 1, wherein the step of adjusting the speed ($V_A$) of the drive means (7a) of the one wheel (3a) and the speed ($V_B$) of the drive means (7b) of the other wheel (3b) is carried out without angular rotation measurement devices secured to the wheel in rotation.

* * * * *